United States Patent
Welch et al.

(10) Patent No.: US 11,639,656 B1
(45) Date of Patent: May 2, 2023

(54) NATURAL GAS CAPTURE FROM A WELL STREAM

(71) Applicant: Total Gas Resource Recovery, LLC, Oklahoma City, OK (US)

(72) Inventors: Nick Welch, Laurel, MS (US); Tracy Turner, Oklahoma City, OK (US)

(73) Assignee: TOTAL GAS RESOURCE RECOVERY, LLC, Oklahoma City, OK (US)

( * ) Notice: Subject to any disclaimer, the term of this patent is extended or adjusted under 35 U.S.C. 154(b) by 0 days.

(21) Appl. No.: 17/821,048

(22) Filed: Aug. 19, 2022

(51) Int. Cl.
   *B01D 19/00* (2006.01)
   *E21B 43/34* (2006.01)
   *B01D 21/24* (2006.01)

(52) U.S. Cl.
   CPC .......... *E21B 43/34* (2013.01); *B01D 19/0042* (2013.01); *B01D 19/0063* (2013.01); *B01D 21/2494* (2013.01)

(58) Field of Classification Search
   CPC . E21B 43/34; B01D 19/0042; B01D 19/0063; B01D 21/2494
   USPC .......................................................... 95/253
   See application file for complete search history.

(56) References Cited

U.S. PATENT DOCUMENTS

| | | | | |
|---|---|---|---|---|
| 3,705,626 A * | 12/1972 | Glenn, Jr. | ............... | E21B 43/34 166/250.15 |
| 3,759,324 A * | 9/1973 | Mecusker | ................. | B04C 9/00 166/267 |
| 3,782,463 A * | 1/1974 | Palmour | .................. | E21B 43/34 166/105.5 |
| 4,160,652 A * | 7/1979 | Martin | ..................... | F17D 1/005 95/254 |
| 4,948,393 A * | 8/1990 | Hodson | .............. | B01D 17/0208 95/254 |
| 5,082,556 A * | 1/1992 | Reese | ...................... | E21B 43/35 210/123 |
| 5,211,842 A * | 5/1993 | Tuss | .................... | B01D 19/0015 210/194 |
| 5,256,171 A * | 10/1993 | Payne | ................ | B01D 19/0057 95/212 |
| 5,507,955 A * | 4/1996 | Webb | ........................ | B04C 5/28 210/741 |
| 5,524,665 A * | 6/1996 | Kolpak | ................... | E21B 43/34 137/188 |
| 5,544,672 A * | 8/1996 | Payne | ................ | B01D 19/0063 137/171 |
| 6,390,114 B1* | 5/2002 | Haandrikman | ......... | E21B 43/34 137/187 |
| 6,537,458 B1* | 3/2003 | Polderman | ............. | B01D 17/00 210/801 |
| 3,002,050 A1 | 8/2011 | Frazier | | |
| 10,807,022 B2 | 10/2020 | Bollom et al. | | |

(Continued)

FOREIGN PATENT DOCUMENTS

WO  WO-2020023692 A1 * 1/2020 ............. E21B 41/00

*Primary Examiner* — T. Bennett McKenzie
(74) *Attorney, Agent, or Firm* — Klemchuk PLLC; Keith C. Rawlins

(57) ABSTRACT

Hydrocarbon gas capture from a well stream can involve recovering light hydrocarbon gases from liquids and solids via a multiphase separator that is upstream of a sand removal system. Pressure is controlled in the multiphase separator to facilitate hydrocarbon gas capture. The light hydrocarbon gases can be recovered for sale or can be used on-site.

17 Claims, 6 Drawing Sheets

(56) References Cited

U.S. PATENT DOCUMENTS

| | | | |
|---|---|---|---|
| 2006/0070735 A1* | 4/2006 | Guerra | E21B 43/35 175/207 |
| 2012/0285896 A1* | 11/2012 | Black | F04B 13/00 210/741 |
| 2013/0284026 A1 | 10/2013 | Warncke | |
| 2015/0034570 A1* | 2/2015 | Andreussi | B01D 17/0211 210/801 |
| 2019/0063203 A1* | 2/2019 | Arefjord | B01D 21/2472 |
| 2019/0120000 A1* | 4/2019 | Santos | E21B 43/34 |
| 2019/0211662 A1* | 7/2019 | Elmer | B01D 21/34 |
| 2020/0324224 A1* | 10/2020 | Allouche | E21B 49/0875 |
| 2020/0346140 A1* | 11/2020 | Soares Da Silva | B01D 21/10 |
| 2020/0370407 A1* | 11/2020 | Bittel | C10G 33/08 |
| 2021/0031134 A1 | 2/2021 | Bollom et al. | |
| 2022/0268143 A1* | 8/2022 | Fink | B01D 17/0214 |

\* cited by examiner

NATURAL GAS CAPTURE FROM A WELL STREAM

FIELD OF THE DISCLOSURE

The present disclosure generally relates to recovering hydrocarbons from a well stream that includes multiple phases of matter.

BACKGROUND

After drilling, isolating, or treating a wellbore, there exists a phase of well stream flow called flowback. Flowback can occur after drilling the wellbore and before treatment and production, after treatment and before production, and during production. The well stream can contain formation fluids (water, natural gases, condensates, crude oil), treatment fluids, and solids such as sand, rock fragments and isolation plug remnants. Sand can be produced from a wellbore when sand is used as proppant to fracture a subterranean formation, and sand can also be native to portions of the subterranean formation and be carried or pushed by fluids (e.g., hydrocarbons, proppant sand) that flow into the wellbore. Well streams produced during flowback can include sand, water, hydrocarbons (e.g., crude oil, nature gases, condensates, or combinations thereof), drill cuttings (rock fragments), isolation plug remnants, or combinations thereof.

Various techniques exist for separating the components of flowback well streams. These techniques usually flare or vent the gas that is separated from liquid and solid components of the well stream. Flaring involves the combustion of hydrocarbons in the gas, and creates carbon dioxide. There is an ongoing need to reduce the carbon footprint of well stream flowback separations.

SUMMARY

Disclosed is a process that can include receiving a well stream from a wellbore; removing a first plurality of solids having a particle size greater than a particle size of sand from the well stream to form a first stream; controlling a flow of the first stream to form a second stream including hydrocarbons, water, and sand; separating the second stream in a multiphase separator into a first portion including light hydrocarbons that are in the gas phase and a second portion including liquid hydrocarbons, water, and sand; flowing the first portion from the multiphase separator in a product gas stream, wherein the product gas stream has a back pressure device located therein; and maintaining, by the back pressure device, a pressure in the multiphase separator in a range of from 15.7 psia to about 500 psia.

Other technical features may be readily apparent to one skilled in the art from the following figures, descriptions and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
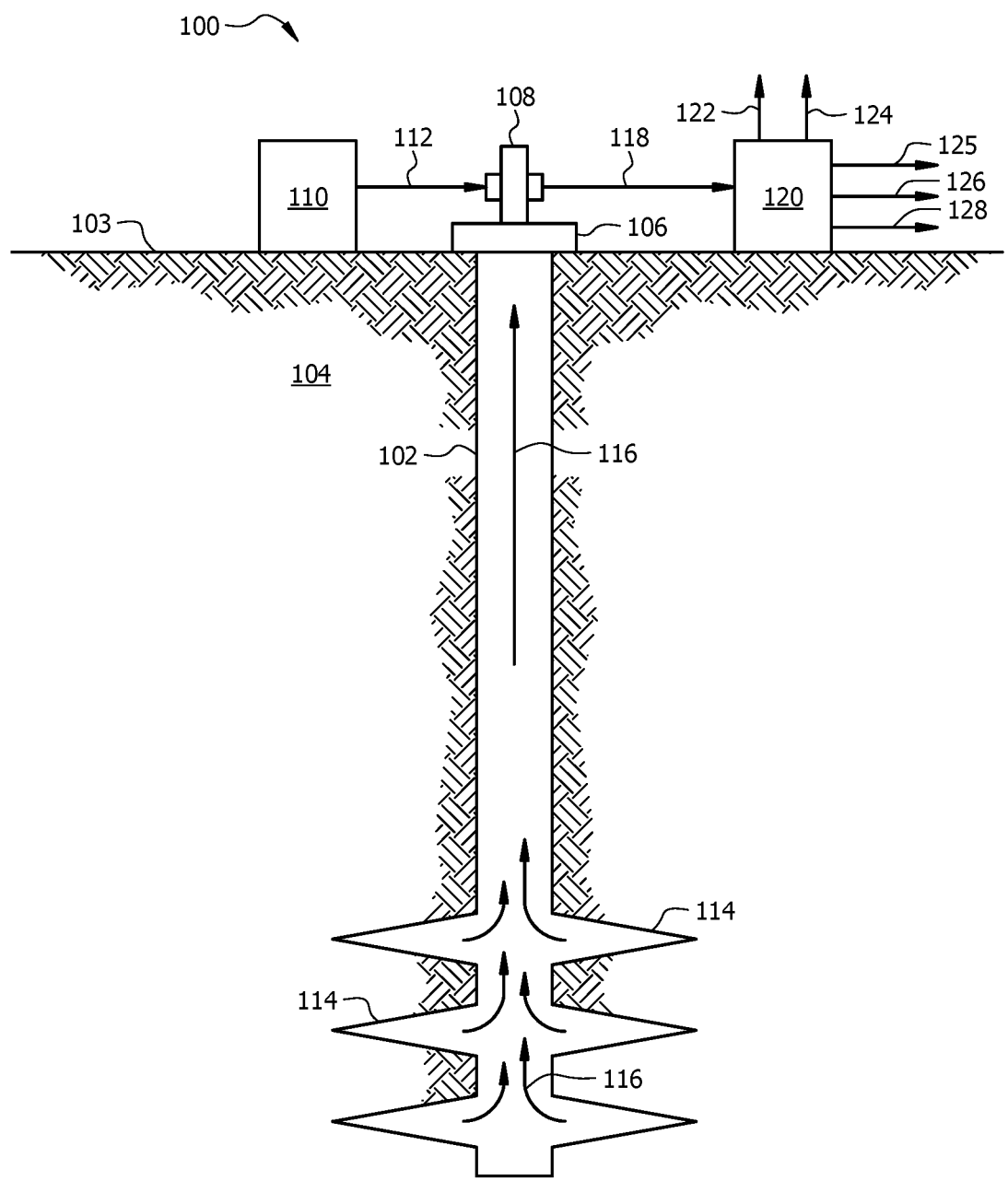
FIG. 1 illustrates a side cross-sectional view of a wellbore environment in which the disclosed process and apparatus can be used.

"Flowback" as used herein includes fluids that flow from a wellbore following a treatment, for example, in preparation for a subsequent phase of treatment or in preparation for returning the wellbore to production.

"Wellbore" as used herein refers to a hole formed in a subterranean formation, for example, through drilling. The wellbore can be conventional (vertically oriented) or unconventional (having horizontally oriented portions). The wellbore can have a depth under the surface of up to about 10,000 ft, for example. Horizontal portions of an unconventional wellbore can extend laterally from a vertical portion and through a subterranean formation for a lateral distance that is up to about 10,000 ft. In aspects, a horizontal portion of the wellbore can have 30 to 90 stages.

"Condensates" as used herein refers to hydrocarbons produced in a well stream that have 5 to 12 carbon atoms, including linear or branched alkanes (e.g., pentane, hexane, heptane and larger alkanes), cyclic alkanes (e.g., cyclohexane), linear or branched alkenes (e.g., pentene, hexene), aromatic compounds (benzene, toluene, xylenes, or combinations thereof), or combinations thereof.

"Crude oil" as used herein refers to hydrocarbons having 13 or more carbon atoms.

The disclosed apparatus and process are described in the context of flowback; however, it is contemplated that the process can be used for any phase of well stream flow (e.g., production) in which the separation of liquid (e.g., non-hydrocarbon liquid such as water or chemical additives injected into a well) from a hydrocarbon gas is desired. The disclosed apparatus and process recover gas for sales or on-site use (avoiding purchase of the gas) that would otherwise be flared or vented. Recovery of this gas reduces the carbon footprint of the well operation because the hydrocarbons in the recovered gas are not converted to carbon dioxide in a flare. Thus aspects of the apparatus and process reduced the carbon footprint in flowback and production operations. Moreover, it has been found that recovering light hydrocarbons in the disclosed multiphase separator, which is upstream of equipment in a sand removal system, enables recovery of 95 vol % or more of methane contained in a well stream (e.g., 95 vol % or more can be recovered for embodiments without compression of product gas, and 80 vol % or more can be recovered for embodiments with compression while fueling the compressors with recovered gas). Further still, the particular configuration and operation of the multiphase separator enables valuable gases to efficiently be separated from the liquid and solids of a well stream, in a manner that the gases are of a purity that can be sold to market or used to power equipment at the wellsite (e.g., power generators for compressors or for ASICs for cryptocurrency (e.g., Bitcoin) mining. For example, a pressure is maintained or controlled at within a setpoint range (e.g., within 5 psi of the setpoint pressure) in the multiphase separator, using back pressure devices to facilitate the light hydrocarbon cut (e.g., C4-hydrocarbons) from the heavier fluids (e.g., C5+ hydrocarbons, water, treatment additive(s), sand, or combinations thereof) in the well stream. Additionally, the configuration of the angled plates in the multiphase separator provide a flowpath in the multiphase separator that facilitates light hydrocarbon separation from the other fluids and that has led to recovery of greater than 95 vol % of the light hydrocarbons during flowback that can be sold or used, for example, for power generators for the equipment or for cryptocurrency (e.g., Bitcoin) mining. Additionally still, the operating pressure of the multiphase separator can be maintained above a sales pipeline pressure such that the pressure difference between the multiphase separator and the sales pipeline can push the product gas to the sales pipeline without the aid of compression. Additionally still, the operating pressure of the multiphase separator can be maintained above an operating pressure of a sand removal system such that the pressure difference between the multiphase separator the sand removal system can push the slurry from the multiphase separator to the sand removal system. Additionally still, the elevated operating pressure (elevated relative to atmospheric pressure) of the multiphase separator disclosed herein can reduce compression requirements for product gas to pass to a sales pipeline having a pressure less than the operating pressure of the multiphase separator. Additionally still, embodiments having the two-float configuration (two level sensors) on the multiphase separator can remove liquid hydrocarbons from the multiphase separator itself separately from a slurry containing water, treatment additive(s), sand, or combinations thereof, without need for sand removal system to have ability to remove the liquid hydrocarbons from the slurry that is received by the sand removal system from the multiphase separator.

FIG. 1 illustrates a wellbore environment 100 in which the disclosed process and apparatus 120 can be used. The wellbore environment 100 includes a wellbore 102 formed in a subterranean formation 104. A well head 106 can cap the wellbore 102 at the surface 103 of the well site. A valve tree 108 (e.g., in embodiments, referred to as a Christmas tree) can be mechanically and fluidly connected to the well head 106 such that fluids can flow through the valve tree 108 and the well head 106 into and out of the wellbore 102, depending on a direction of flow of fluids.

Treatment equipment 110 can be placed at the surface 103 of the well site. Treatment equipment 110 can be fluidly connected to the valve tree 108 by conduit(s) 112. Treatment equipment 110, by example, can include fracturing equipment. In a fracturing example, the fracturing equipment can inject a high-pressure fracturing fluid (e.g., proppant including sand, ceramic beads, glass beads, or combinations thereof) through the conduit 112, through the valve tree 108, through the well head 106, and into the wellbore 102 so as to fracture portion of the subterranean formation 104. Fracturing the subterranean formation 104 can produce fractures 114.

After use of the treatment equipment 110 (e.g., such as to produce fractures 114), the wellbore environment 100 can be adjusted for production. For example, the valve tree 108 used during treatment might be changed for a valve tree that is suitable for production. Valve tree 108 illustrated in FIG. 1, and those illustrated herein, are illustrated with the same structure for clarity; however, it is contemplated that different valve trees can include any appropriate valve tree configuration for a particular phase of well operations, e.g., a frac tree for fracturing operations, a stimulation tree for well stimulation via stream and/or chemical injection, or a production tree for production of fluids from the wellbore.

For production (including flowback phases of operation), fluids 116 can be allowed to flow upward through the wellbore 102 to the surface 103, through the well head 106, and to the valve tree 108 (e.g., embodied as a suitable production valve tree). A well stream 118 can be fluidly connected to the valve tree 108 and to the apparatus 120 disclosed herein. The produced fluids 116 can flow through the valve tree 108, through well stream 118, and to the apparatus 120 of this disclosure. The well stream 118 can include, without limitation, crude oil, natural gases, condensates, water, proppant (e.g., sand), treatment additives (e.g., chemicals injected into the subterranean formation 104 to alter a chemistry within the formation to enhance hydrocarbon recovery), isolation plug remnants, fragments of casing, rock fragments, or combinations thereof. A pressure of the well stream 118 can be in a range of from about 10,000 psia to 15,000 psia, for example.

The apparatus 120 of the disclosure can be configured to separate the well stream 118 into one or more of a product gas stream 122, a residual gas stream 124, a liquid hydrocarbon stream 125, a liquid aqueous stream 126, and a solids stream 128. Additional detail about the apparatus 120 is discussed in the description below.

Figure 2:
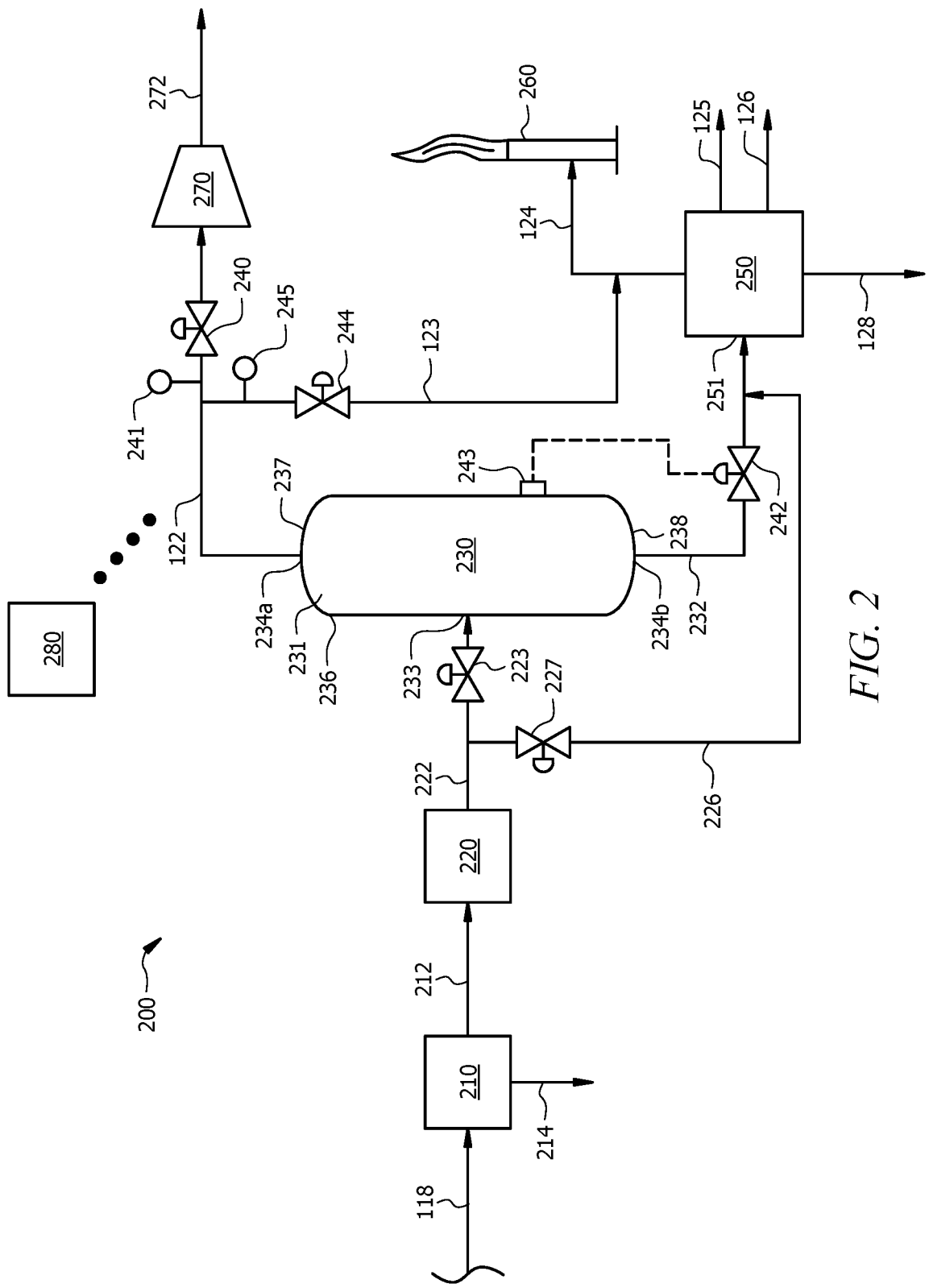
FIG. 2 illustrates a schematic diagram of embodiments of the disclosed apparatus.

FIG. 2 illustrates a schematic diagram of an embodiment of the disclosed apparatus 200. The apparatus 200 in FIG. 2 can be used as apparatus 120 in FIG. 1, for example. While the apparatus 200 is described with reference to the equipment illustrated in FIG. 2, it should be appreciated that the action and functionality performed with the equipment illustrated in FIG. 2 can be performed in one or more aspects of a disclosed process.

The apparatus 200 can include one or more of a plug catcher 210, a choke manifold 220, a multiphase separator 230, one or more back pressure device 240/244, a slurry control valve 242, a sand removal system 250, a flare 260, compressor(s) 270, and a control system 280. While compressors 270 are illustrated in FIG. 2 to compress a gas recovered from the multiphase separator 230, alternative aspects of the apparatus 200 and process do not utilize compressors 270, and as such, any alternative process performed may not include compression of gas recovered from the multiphase separator 230.

The apparatus 200 is configured to receive the well stream 118 and to produce a product gas stream 122, a residual gas stream 124, a liquid aqueous stream 126, and a solids stream 128. The apparatus 200 can, in some aspects, additionally product a liquid hydrocarbon stream 125.

The plug catcher 210 is fluidly connected to the well stream 118. The plug catcher 210 is configured to receive the well stream 118 and to separate heavy particulates from the well stream 118 to produce the first stream 212 containing a wellbore fluid and a solids stream 214 containing the heavy particulates. For example, the plug catcher 210 can be used when zone isolation plugs are milled out to allow fluids 116 to flow upward through the wellbore 102 to the surface 103. The wellbore fluid 116 flows to the plug catcher 210 via the well stream 118. Heavy particulates removed by the plug catcher 210 can include the isolation plug remnants, and additionally, can include fragments of casing, rock fragments, or combinations thereof. Other solids, such as sand proppant, can be incidentally removed by the plug catcher 210 along with the heavy particulates, with the understanding that sand is primarily allowed to pass through the screen(s) of the plug catcher 210 and is recovered downstream by the sand removal system 250 in the solids stream 128. An operating pressure of the plug catcher 210 can be in a range of from about 10,000 psia to 15,000 psia, for example. The plug catcher 210 can be embodied as a single barrel with bypass or as a dual barrel plug catcher, for example. A screen in the plug catcher 210 acts as a filter that prevents heavy particulates from passing through the screen. The plug catcher 210 can include one or more valves connected on the heavy particulate side of the screen, for intermittent or continuous removal of the heavy particulates from the barrel of the plug catcher 210, into the solids stream 214. The heavy particulates in solids stream 214 can be discharged into a tank, ditch, or onto the ground next to the plug catcher 210, for example.

The first stream 212 can include crude oil, natural gases, condensates, water, proppant (e.g., sand), treatment additives (e.g., chemicals injected into the subterranean formation 104 to alter a chemistry within the formation to enhance hydrocarbon recovery), or combinations thereof. In aspects, the pressure of the first stream 212 can be in a range of from about 10,000 psia to 15,000 psia, for example.

The choke manifold 220 can be fluidly connected to the first stream 212. The choke manifold 220 can be configured to receive the first stream 212 and to control a flow of fluids received from the first stream 212 to produce a second stream 222 having a flow suitable for introducing the second stream 222 to the multiphase separator 230. The choke manifold 220 is a manifold assembly that can incorporate chokes, valves, and pressure sensors to provide controlled flow of fluids in second stream 222 that are received by the choke manifold 220 from first stream 212. The choke manifold 220 can include flanged or integrated gate valves, positive chokes, and adjustable chokes, for example.

In some aspects, the choke manifold 220 can be configured to reduce the pressure of the fluids received from the first stream 212 to a second pressure in the second stream 222, such that the pressure of the second stream 222 is lower than a pressure of the first stream 212. To the extent that pressure is reduced in the choke manifold 220, the pressure is sufficient such that the pressure differential between the pressure at the end of the second stream 222 that is connected to the choke manifold 220 and the pressure in the product gas stream 122 is sufficient to push the fluids in the second stream 222 into the multiphase separator 230, where the pressure in the product gas stream 122 is maintained or controlled using the back pressure device 240, the back pressure device 244, the control valve 242, or combinations thereof (explained in more detail below).

The second stream 222 can include the same components of the first stream 212, e.g., crude oil, natural gases, condensates, water, proppant (e.g., sand), treatment additives (e.g., chemicals injected into the subterranean formation 104 to alter a chemistry within the formation to enhance hydrocarbon recovery), or combinations thereof. In aspects, the pressure of the second stream 222 can be at least 15.7, 20, 25, 30, 35, 40, 45, or 50 psia and less than 500, 400, 300, 200, 150, 140, 130, 120, 110, 100, 90, 80, 75, or 60 psia. In aspects, the pressure of the second stream 222 can be in range from any minimum pressure to any maximum pressure described for the second stream 222 herein. In aspects, the pressure of the second stream 222 can be equal or about equal to the operating pressure of the multiphase separator 230, described herein.

The second stream 222 is configured to fluidly connect with an inlet 233 of the multiphase separator 230. In some aspects, a bypass line 226 can be fluidly connected with second stream 222. In these aspects, valve 223 can be included in second stream 222, and valve 227 can be included in bypass line 226. In operation of the multiphase separator 230, valve 223 can be operated in an open position and valve 227 can be operated in closed position. In scenarios where bypass of the multiphase separator 230 is needed, such as for maintenance of the multiphase separator 230, valve 223 can be actuated to a closed position and valve 227 can be actuated to an open position such that the fluids in the second stream 222 flow through bypass line 226 and bypass the multiphase separator 230. The bypass line 226 can have an outlet fluidly connected to an inlet 251 of the sand removal system 250. In FIG. 2, the bypass line 226 combines with the slurry stream 232 before flowing to the sand removal system 250. In aspects, valve 223 and valve 227 can be electrically, mechanically, or pneumatically actuated between the closed position and the opening. The valves 223 and 227 can be actuated by personnel manually turning the valves 223 and 227 to respective positions; alternatively, one or both of the valves 223 and 227 can be operably coupled (e.g., via wired or wireless lines) to a control system 280 having software programming for sending signals to equipment that electrically, mechanically, or pneumatically actuates the valves 223 and 227.

The multiphase separator 230 is fluidly connected to the second stream 222. The multiphase separator 230 is configured to receive the second stream 222 and to separate the second stream 222 into the product gas stream 122 and into the slurry stream 232.

The multiphase separator 230 can be embodied as one or more vessels (one vessel 231 being illustrated in FIG. 2) having an inlet 233, a first outlet 234a, and a second outlet 234b. The second stream 222 is connected to the inlet 233, the product gas stream 122 is connected to the first outlet 234a, and the slurry stream 232 is connected to the second outlet 234b of the multiphase separator 230. In aspects, the inlet 233 is located on a side 236 of the vessel 201, the first outlet 234a is located on a top 237 of the vessel 231, and the second outlet 234b is located on a bottom 238 of the vessel 231.

The product gas stream 122 can include light hydrocarbon gases, such as methane, ethane, propane, butane, or combinations thereof. In additional aspects, the product gas stream 122 can include other hydrocarbons that are gases at the operating conditions of the multiphase separator 230. In aspects, the product gas stream 122 can include light hydrocarbon gases in an amount that is greater than 95, 99, 97, 99, or 99 vol % of the total volume in the product gas stream 122.

The slurry stream 232 can include liquids and solid phase particulates. The liquids can include crude oil, condensates, water, treatment additives (e.g., chemicals injected into the subterranean formation 104 to alter a chemistry within the formation to enhance hydrocarbon recovery), or combinations thereof. The solid phase particulates can primarily include sand, as well as small fragments of rock and plugs that pass through the screen(s) in the plug catcher 210. Within the scope of "slurry" as used herein, it is contemplated that the solids can be dispersed in the liquid, uniformly or nonuniformly; alternatively, such as while in the vessel 231 of the multiphase separator 230, the slurry can have most of the solids separate from most of the liquid, such as would occur for sand settling to the bottom 238 of the vessel 231 due to a higher density of the sand than the liquids in the vessel 231, the liquids being on top of the sand (it is contemplated that liquid can be entrained between particles of sand that are in the bulk of sand at the bottom 238 of the vessel 231). The scope of slurry contemplates the presence of liquids and solids together regardless whether any certain amount of the solids is dispersed or separate from the liquids.

The product gas stream 122 can include a back pressure device 240. Back pressure device 240 can be configured to maintain an operating pressure in the multiphase separator 230 (e.g., a pressure in a range of from 15.7 psia to about 500 psia; alternatively, in a range of from 15.7 psia to about 150 psia; alternatively about 50 psia). The back pressure device 240 can be embodied as a control valve configured to control a flow of gas in the product gas stream 122. The product gas stream 122 can also include a sensor 241. The sensor 241 can be a transducer configured to measure pressure of the product gas stream 122, for example. The back pressure device 240 can be operably coupled to the sensor 241 for actuating the back pressure device 240 so as to control a flow of gas through the product gas stream 122. Controlling the flow of gas through the product gas stream 122 controls the pressure in the multiphase separator 230. In some aspects, the back pressure device 240 and sensor 241 can be operably (e.g., via wired or wireless signal) coupled to a control system 280 that has software programming for receiving the signal from the sensor 241, analyzing the signal, and sending a signal to the back pressure device 240 to control the flow of gas in the product gas stream 122. In aspects, the sensor 241 can be located to measure pressure in the product gas stream 122 upstream of back pressure device 240 or in the vessel 231.

The slurry stream 232 can include a control valve 242. Control valve 242 can be configured to allow or disallow a flow of slurry out of the bottom 238 of the vessel 231 of the multiphase separator 230. The control valve 242 can be embodied as a control valve configured to control a flow of slurry in the slurry stream 232. A level sensor 243 can be coupled to the side 236 of the vessel 231 of the multiphase separator 230. The sensor 243 can be float sensor configured to extend into an interior of the vessel 231 and to float on or near a surface of the slurry in the vessel 231. The sensor 243 can send (or not send) a signal to the control valve 242 to allow or disallow flow of slurry out of the vessel 231 in the slurry stream 232, based on the level of slurry in the vessel 231 relative to a setpoint level. For example, the sensor 243 can send a signal to the control valve 242 to actuate to an open position when the float level is above the setpoint level and send another signal to control valve 242 to actuate to a closed position when the float level falls below the setpoint level. The control valve 242 can be operably coupled to the sensor 243 for actuating the control valve 242 so as to allow or disallow a flow of slurry through the slurry stream 232. In some aspects, the control valve 242 and sensor 243 can be operably (e.g., via wired or wireless signal) coupled to the control system 280 that has software programming for receiving the signal from the sensor 243, analyzing the signal, and sending a signal to the control valve 242 to allow or disallow flow of slurry in the slurry stream 232.

In some aspects, flowing slurry out of the vessel 231 via control valve 242 can temporarily reduce the pressure in the vessel 231 while the control valve 242 is in the open position, such as when the vol % of liquids and solids recovered from the second stream 222 is greater than the vol % of product gas recovered from the second stream 222. The change in pressure in the vessel 231 can be measured in the vessel 231, in the product gas stream 122, in the product gas bypass line 123, or combinations thereof. In aspects, the sensor 241 can indicate a change in pressure due to slurry removal from the vessel 231, and if the pressure falls below a setpoint operating pressure for the multiphase separator 230, the back pressure device 240 can be actuated to a closed position until the pressure in the vessel 231 rises above the setpoint operating pressure.

The product gas stream 122 can flow a sales pipeline, a vent, a flare, a gas processing unit (e.g., further treatment or processing), a storage tank, or a combination thereof.

In FIG. 2, the product sales gas stream 122 flows to a gas processing unit for further treatment via compression. The product sales gas stream 122 is fluidly connected to one or more compressors 270 that are embodied as the gas processing unit. A gas processing unit can additionally or alternatively include a scrubber to remove sulfur-containing compounds from the product sales gas stream 122. The compressor(s) 270 are configured to receive the product gas stream 122 and to compress the gases to form a compressed gas stream 272. The compressed gas stream 272 can have a pressure suitable for storage in a storage tank, flow to a sales pipeline, or flow to further treatment, for example.

In some aspects, a product gas bypass line 123 can be fluidly connected to the product gas stream 122. The product gas bypass line 123 can be coupled to residual gas stream 124, to divert gas in the product gas stream 122 to the flare 260. For example, a stoppage of flow in product gas stream 122 downstream of the back pressure device 240, a shutdown of equipment that is downstream of the product gas stream 122 (such as compressor(s) 270 in FIG. 2), a stoppage of gas flow in compressed gas stream 272, or combinations thereof, can cause need to divert product gas flow through product gas bypass line 123.

The product gas bypass line 123 can include another back pressure device 244. In exemplary scenarios where product gas cannot flow downstream of the first back pressure device 240 in the product gas stream 122, the pressure in the vessel 231 will increase to the setpoint pressure of the back pressure device 244. That is, the back pressure device 244 can be configured to actuate at a setpoint pressure that is a +/−10 psi difference from a setpoint pressure of the back pressure device 240. At the point at which pressure increases to the setpoint pressure of the back pressure device 244, the back pressure device 244 is configured to actuate, or to be actuated by the control system 280, from the closed position to the open position, to allow flow or product gas through the product gas bypass line 123. Product gas can flow through the product gas bypass line 123 until the pressure in the product gas bypass line 123 falls below the setpoint for the back pressure device 244, after which the back pressure device 244 is actuated from the open position to the closed position. Back pressure device 244 can remain in the closed position until another event causes the pressure in the multiphase separator 230 to rise such that the pressure detected in the product gas bypass line 123 exceeds the setpoint pressure for the back pressure device 244. In aspects, the back pressure device 244 can be embodied as a control valve configured to control a flow of gas in the product gas bypass line 123. The product gas bypass line 123 can also include a sensor 245 located in the product gas bypass line 123 upstream of the back pressure device 244. The sensor 245 can be a transducer configured to measure pressure of the product gas bypass line 123, for example. The back pressure device 244 can be operably coupled to the sensor 245 for actuating the back pressure device 244 so as to control a flow of gas through the product gas bypass line 123. Controlling the flow of gas through the product gas bypass line 123 can control the pressure in the multiphase separator 230 at the setpoint of the back pressure device 244. In some aspects, the back pressure device 244 and sensor 245 can be operably (e.g., via wired or wireless signal)

coupled to a control system 280 that has software programming for receiving the signal from the sensor 245, analyzing the signal, and sending a signal to the back pressure device 244 to control the flow of gas in the product gas bypass line 123.

In aspects, the sensor 245 can be the same sensor as sensor 241, e.g., a single sensor senses the pressure for controlling back pressure device 240 and back pressure device 244. In aspects having a single sensor 241, the sensor 241 can be located to measure pressure in the product gas stream 122 upstream of back pressure device 240, the product gas bypass line 123 upstream of the back pressure device 244, or the vessel 231.

When the product gas bypass line 123 is used for flow of product gas, the back pressure device 240 in the product gas stream 122 can be actuated (e.g., by control system 280) to a closed position. Actuating the back pressure device 240 to a closed position stops a flow of the product gas in the product gas stream 122. The back pressure device 244 can be actuated (e.g., by control system 280) to an open position, to allow flow of product gas in product gas bypass line 123. The back pressure device 244 can control the flow of product gas in product gas bypass line 123 so as to control and/or maintain the operating pressure in the multiphase separator 230.

When flow of product gas should re-start in the product gas stream 122, the back pressure device 244 in the product gas bypass line 123 can be actuated (e.g., by control system 280) to a closed position. Actuating the back pressure device 244 to a closed position stops a flow of the product gas in the product gas bypass line 123. The back pressure device 240 in the product gas stream 122 can be actuated (e.g., by control system 280) to an open position, to allow flow of product gas in product gas stream 122. The back pressure device 240 can control the flow of product gas in product gas stream 122 so as to control and/or maintain the operating pressure in the multiphase separator 230.

Aspects of the apparatus 200 and process disclosed herein contemplate that flow of product gas can be switched from the product gas stream 122 to the product gas bypass line 123 by actuating back pressure devices 240 and 244 as described above, while maintaining the operating pressure of the multiphase separator 230.

Aspects of the apparatus 200 and process disclosed herein additionally or alternatively contemplate that flow of product gas can be switched from the product gas bypass line 123 to the product gas stream 122 by actuating back pressure devices 240 and 244 as described above, while maintaining the operating pressure of the multiphase separator 230.

Aspects of the apparatus 200 and process disclosed herein additionally or alternatively contemplate that product gas can flow in both the product gas stream 122 and in the product gas bypass line 123, such as in scenarios where sudden the flow of product gas in product gas stream 122 need to decrease but not stop (e.g., pipeline capacity temporarily decreases). For example, the back pressure device 244 in the product gas bypass line 123 can be actuated (e.g., by control system 280) to an open position while keeping the back pressure device 240 in the open position. Actuating the back pressure device 244 to an open position allows the flow of the product gas in the product gas bypass line 123. The back pressure devices 240 and 244 can jointly control the flow of product gas in product gas stream 122 and the product gas bypass line 123 so as to control and/or maintain the operating pressure in the multiphase separator 230.

In some aspects, flowing slurry out of the vessel 231 via control valve 242 can temporarily reduce the pressure in the vessel 231 due to slurry removal from the vessel 231, such as when the vol % of liquids and solids recovered from the second stream 222 is greater than the vol % of product gas recovered from the second stream 222. The change in pressure in the vessel 231 can be measured in the vessel 231, in the product gas stream 122, in the product gas bypass line 123, or combinations thereof. In aspects, one or both of sensors 241 and 245 can indicate a change in pressure, and if the pressure falls below a setpoint operating pressure for the multiphase separator 230, the back pressure device(s) 240 and/or 244 that are/is in open position (e.g., depending whether product gas flows to compressor(s) 270 or to flare 260, or to both) can be actuated to a closed position until the pressure in the vessel 231 rises above the setpoint operating pressure, at which time the controls can actuate the back pressure device(s) 240 and/or 244 that are/is in closed position back to the open position.

The slurry removed from the multiphase separator 230 in slurry stream 232 can flow to the sand removal system 250. An inlet 251 of the sand removal system 250 can be fluidly connected to the slurry stream 232.

In some aspects, the sand removal system 250 in FIG. 2 can be configured to receive the slurry in the slurry stream 232 and to separate the slurry into a residual gas stream 124 containing residual gaseous components that were not removed from the slurry in the multiphase separator 230, a liquid aqueous stream 126, and a solids stream 128. In aspects, the residual gas stream 124 contains less than 5, 4, 3, 2, or 1 vol % of the total gases recovered from the second stream 222. In some aspects, the liquid aqueous stream 126 can contain crude oil, condensates, water, treatment additives (e.g., chemicals injected into the subterranean formation 104 to alter a chemistry within the formation to enhance hydrocarbon recovery), or combinations thereof. In alternative aspects, the sand removal system 250 can be configured to separate liquid hydrocarbons (e.g., crude oil, condensates, or both) and water received from the slurry stream 232 so as to produce liquid hydrocarbon stream 125 containing the liquid hydrocarbons and the aqueous stream 126 containing water. The solids stream 128 can contain sand, and in some aspects, small fragments of rock and plugs that pass through the screen(s) in the plug catcher 210.

The sand removal system 250 can be embodied as any equipment known in the art with the aid of this disclosure that is configured to separate a slurry into components parts. For example, the sand removal system 250 can be embodied to include a gravity separation tank, where water of the slurry can be allowed to evaporate from the solids (e.g., sand). The sand removal system 250 can additionally or alternatively include other techniques for separating components of the slurry received from the multiphase separator 230, such as techniques disclosed in U.S. Pat. No. 8,002,050 or U.S. Patent Application Publication No. 2013/0284026A1, each of which is incorporated by reference in its entirety.

The residual gas stream 124 can flow to the flare 260. The flare 260 can be any flare known in the art with the aid of this disclosure. The flare 260 can have a flare stack and a flare tip for combustion of flammable components (e.g., the residual gas from the residual gas stream 124, and in some aspects, at least a portion of the hydrocarbons from product gas stream 122).

The liquid aqueous stream 126 can flow to a liquid storage tank or to downstream separation stages for further separation of water from other liquids (e.g., liquid hydrocarbons, treatment additives, or both). For example, the sand removal system 250 can include a gravity separation tank. In some aspects, the liquid aqueous stream 126 containing liquid hydrocarbons and water can be recovered from the gravity separation tank and sent to a liquid hydrocarbon/water separation apparatus such as that disclosed in U.S. Patent Application Publication No. 2013/0284026A1, for skimming of the liquid hydrocarbons from water. In other aspects, the sand removal system 250 can include a liquid hydrocarbon/water separation apparatus such as that disclosed in U.S. Patent Application Publication No. 2013/0284026A1, and the sand removal system 250 can produce the liquid aqueous stream 126 containing water and the liquid hydrocarbon stream 125 containing liquid hydrocarbons. The water can be sent to storage or reinjected into the subterranean formation, for example. The liquid hydrocarbons can be recovered for storage or pumped to a sales pipeline.

Control system 280 can be embodied as one or more computers having hardware and software for receiving signals from sensors and for sending signals or otherwise controlling instrumentation in the apparatus 200 and process. For example, the control system 280 can be programmed to control one or more of valves 223, 227, and 242 and back pressure devices 240 and 244.

Figure 3:
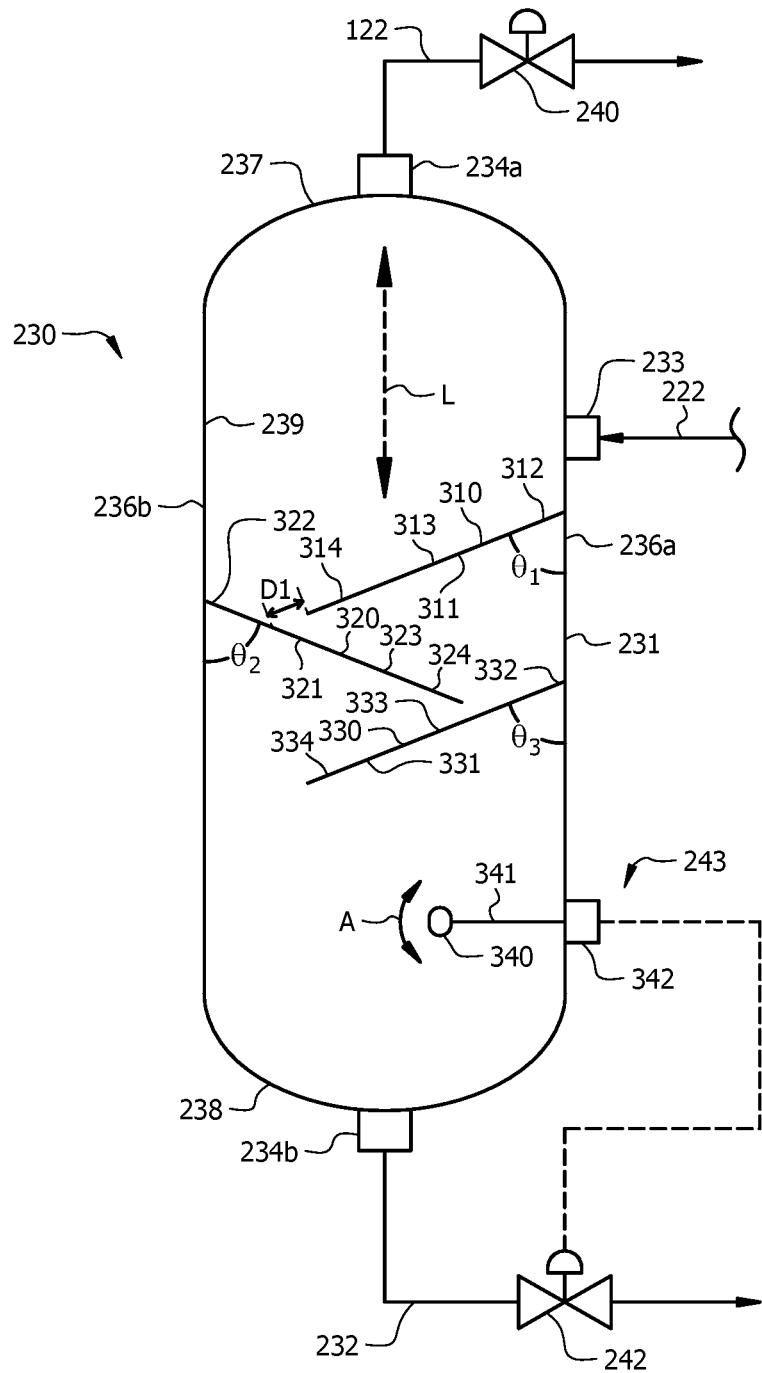
FIG. 3 illustrates a cut-away schematic diagram of an embodiment of the multiphase separator in the apparatus of FIG. 2.

FIG. 3 illustrates a cut-away schematic diagram of an embodiment of the multiphase separator 230 of the disclosed apparatus 200. Parts of the multiphase separator 230 in FIG. 3 are labeled with the same references numerals for like parts illustrated in FIG. 2. Angled plates 310, 320, and 330 can be seen in the interior of the vessel 231 of the multiphase separator 230.

The multiphase separator 230 in FIG. 3 is described with respect to separation of the second stream 222 into a first portion that is in gas phase and a second portion that is in liquid and solid phases. As previously described for the multiphase separator 230 in FIG. 2, the multiphase separator 230 in FIG. 3 can include a vessel 231, an inlet 233 connected to a side 236a of the vessel 231, a first outlet 234a connected to a top 237 of the vessel 231, and a second outlet 234b connected to a bottom 238 of the vessel 231. The inlet 233 is configured to receive the second stream 222, the first outlet 234a is configured to receive the first portion from the interior of the vessel 231 (gases separated from liquids and solids in the vessel 231), and the second outlet 234b is configured to receive the second portion from the interior of the vessel 231 (the liquid and solids separated from the gases in the vessel 231).

A first angled plate 310 is connected to an inner wall 239 of the vessel 231 at a first location that is below where the inlet 233 is connected to the side 236a of the vessel 231. Particularly, end 312 of the first angled plate 310 is connected to the side 236a of the vessel 231 below the inlet 233. The first angled plate 310 extends at an angle downwardly past the longitudinal axis L of the vessel 231. Particularly opposite end 314 of the first angled plate 310 extends from the inner wall 239 and past the longitudinal axis L. An angle $\theta_1$ between a bottom surface 311 of the first angled plate 310 and the inner wall 239 (e.g., the vertical wall) of the vessel 231 is in a range of from about 45° to about 75°; alternatively, about 60°.

A second angled plate 320 is connected to the inner wall 239 of the vessel 231 at a second location that is lower than the first location where the first angled plate 310 is connected to the inner wall 239. Particularly, end 322 of the second angled plate 320 is connected to the side 236b of the vessel 231 that is opposite the side 236a where the second angled plate 320 is connected. The second angled plate 320 extends at an angle downwardly past the longitudinal axis L of the vessel 231. Particularly opposite end 324 of the second angled plate 320 extends from the inner wall 239 and past the longitudinal axis L. An angle $\theta_2$ between a bottom surface 321 of the second angled plate 320 and the inner wall 239 (e.g., the vertical wall) of the vessel 231 is in a range of from about 45° to about 75°; alternatively, about 60°.

A third angled plate 330 is connected to the inner wall 239 of the vessel 231 at a third location that is lower than the first location where the first angled plate 310 is connected to the inner wall 239 and lower than the second location where the second angled plate 320 is connected to the inner wall 239. Particularly, end 332 of the third angled plate 330 is connected to the side 236a of the vessel 231 that is the same side 236a where the first angled plate 310 is connected and opposite the side 236b where the second angled plate 320 is connected to the inner wall 239. The third angled plate 330 extends at an angle downwardly from the inner wall 239 and past the longitudinal axis L of the vessel 231. Particularly opposite end 334 of the third angled plate 330 extends past the longitudinal axis L. An angle $\theta_3$ between a bottom surface 331 of the third angled plate 330 and the inner wall 239 (e.g., the vertical wall) of the vessel 231 is in a range of from about 45° to about 75°; alternatively, about 60°.

Alternative aspects of the multiphase separator 230 contemplate that more or fewer angled plates can be used in the vessel 231.

In aspects, a distance D1 between the opposite end 314 of the first angled plate 310 and a top surface 323 of the second angled plate 320 is in a range of from about 6 inches to about 12 inches; alternatively, from about 8 inches to about 11 inches; alternatively, from about 9 inches to about 10 inches. In aspects, a distance D1 between the opposite end 324 of the second angled plate 320 and a top surface 333 of the third angled plate 330 is in a range of from about 6 inches to about 12 inches; alternatively, from about 8 inches to about 11 inches; alternatively, from about 9 inches to about 10 inches.

The level sensor 243 can be seen with float 340 connected to a stem 341 that is connected to the body mount 342. The body mount 342 is connected to the side 236a of the vessel 231. While shown connected to side 236a, the body mount 342 can be connected to any location on the circumference of the vessel 231. Generally, the level sensor 243 is connected to the vessel 231 at a location lower than the lowest angled plate (e.g., the third angled plate 330 in FIG. 3). The float 340 and stem 341 are sized so as not to contact the bottom surface of the lowest plate (e.g., bottom surface 331 of the third angled plate 330). Double arrow A indicates the movement of the float 340 of the level sensor 243. The level sensor 243 is configured such that the float 340 floats on a top surface of the second portion of fluids in the vessel 231 (including liquid hydrocarbons, treatment additive(s), water, sand, or combinations thereof). For example, for a second portion that contains both solids (e.g., sand) and liquids (e.g., water, liquid hydrocarbons (e.g., crude oil, condensates, or both), treatment additives, or combinations thereof), the sand can fall to the bottom 238 of the vessel 231 and the liquids can locate on top of the sand. The float 340 is configured with a density less than the liquid hydrocarbons (e.g., condensates, crude oil, or both) such that the float 340 can float on a surface of crude oil, condensates, water, or a mixture thereof that is inside the vessel 231. The float 340 moves up and down as the level of solids and liquids raises and lowers due to incoming fluid from the second stream 222 and due to removal of the second portion from the vessel 231 via the slurry stream 232.

The multiphase separator 230 can be manufactured of suitable metal, flanges, piping, valving, and combinations thereof. Exemplary internal diameter of the vessel 231 of the multiphase separator 230 includes diameters in the range of from about 36 inches to about 60 inches; alternatively, from about 42 inches to about 54 inches; alternatively, about 48 inches. Exemplary heights of the vessel 231 of the multiphase separator 230 includes heights in the range of from about 108 inches to about 132 inches; alternatively, from about 114 inches to about 126 inches; alternatively, about 120 inches. An exemplary location for the level sensor 243 can be a height on the side 236 of the vessel 231 that is about 3 feet above the bottom 238 of the vessel 231. An exemplary location for the inlet 233 can be a height on the side 236 of the vessel 231 that is about 8 feet above the bottom 238 of the vessel 231, and the angled plates 310/320/330 are placed at locations in the vessel 231 that have a height above the bottom 238 of the vessel 231 that is less than the height of the inlet 233.

Inlet 233 and outlet 234a can each have a nominal pipe size in a range of from about 4 inches to about 8 inches; alternatively, about 6 inches. Outlet 234b can have a nominal pipe size that is greater than the inlet 233 and outlet 234a, for example, in a range of from about 8 inches to about 12 inches; alternatively, about 10 inches. The diameter of outlet 234a is configured to prevent undue friction pressure losses of product gas stream 122 and also to reduce internal flow velocities of the product gas stream 122 where there could be a potential of entraining a small percentage of the liquid phase in the fluid flow into outlet 234a. The larger diameter (nominal pipe size) of the outlet 234b is configured to prevent solids blockage in the outlet 234b.

In aspects, the operating conditions in the multiphase separator 230 can include temperature, pressure, residence time of slurry, and throughput. In aspects, no heat is added or removed from the multiphase separator 230, and the temperature can be the ambient temperature of the fluids as affected by environmental conditions at the wellsite, e.g., 100° F. day time temperature during a summer in eastern Texas. The operating pressure can be any pressure disclosed herein for the multiphase separator 230, such as at least 15.7, 20, 25, 30, 35, 40, 45, or 50 psia and less than 500, 400, 300, 250, 200, 150, 140, 130, 120, 110, 100, 90, 80, 75, or 60 psia. In aspects, the pressure of the multiphase separator 230 can be in range from any minimum pressure to any maximum pressure described for the multiphase separator 230. The residence time of the slurry can be the time between actuation of the control valve 242 in the slurry stream 232, which be in a range of from about 1 minute to 1 day. The throughput of the multiphase separator 230 can depend on the flow rate of the well stream 118, and the vessel 231, streams 122 and 232, back pressure devices 240 and 244, and control valve 242 can be appropriately sized for the flowrate of fluids in the well stream 118. An example throughput can be in a range of less than about 5,500 barrels per day.

Fluid from stream 222 can flow into the vessel 231 via the inlet 233. Components of the stream 222 that are in gas phase (e.g., light hydrocarbons) separate from the liquids (e.g., condensate, crude oil, water, treatment additives, or combinations thereof). The operating conditions (temperature and pressure) inside the vessel 231 are such that light hydrocarbons, to the extent not already in a gas phase in stream 222, can flash from the liquids to form the first portion in gas phase that is described herein, recovered in the product gas stream 122. The liquids and solids together move on the top surface 313 of the first angled plate 310 from end 312 to end 314, falling down to the top surface 323 of the second angled plate 320 at end 314 of the first angled plate 310. The liquids and solids together move on the top surface 323 of the second angled plate 320 from end 322 to end 324, falling down to the top surface 333 of the third angled plate 330 at end 324 of the second angled plate 320. The end 334 of the third angled plate 330 extends past the longitudinal axis L of the vessel 231 such that solids and liquids fall to the bottom 238 of the vessel 231 but not directly over the second outlet 234b.

Configuring the ends 314/324/334 of each of the plates 310/320/330 to extend past the longitudinal axis L of the vessel 231 creates a single flow path for the fluids that enter the vessel 231. The fluids must flow over the first angled plate 310 before flowing over the second angled plate 320, and must flow over the second angled plate 320 before flowing over the third angled plate 330. The configuration of the plates 310/320/330 increases the length of the flow path compared to vessels where the fluids fall directly to the bottom or that have only one plate which the fluid contacts before falling to the bottom of the vessel. The increased length of the flow path increases the amount of time given for gases to separate from the liquids and solids in the vessel 231 before the liquids and solids fall to the bottom 238 of the vessel 231. This increased length of flow path has led to recovery of more than insignificant amounts of light hydrocarbons during flowback that can be sold or used, for example, for power generators for the equipment or for cryptocurrency (e.g., bitcoin) mining.

Figure 4:
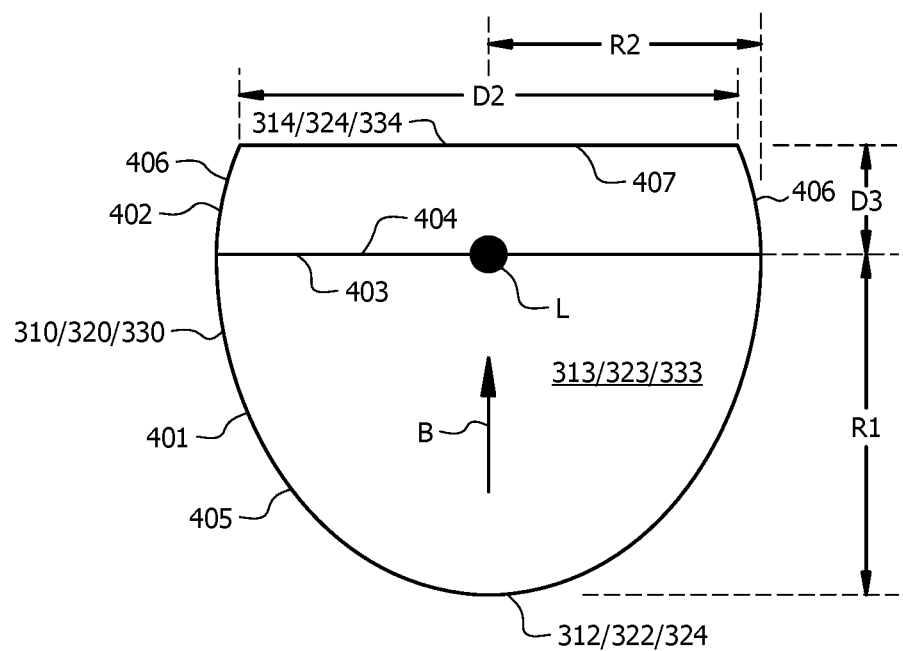
FIG. 4 illustrates a plan view of an angled plate.

FIG. 4 illustrates a plan view of an angled plate 310/320/330. The plate 310/320/330 will be described with additional reference to the reference numerals in and described for FIG. 3.

End 312 of the first angled plate 310 is connected (e.g., welded) to the side 236a of the vessel 231 of the multiphase separator 230, and opposite end 314 of the plate 310 can be seen extending past the longitudinal axis L of the vessel 231. End 322 of the second angled plate 320 is connected (e.g., welded) to the side 236b of the vessel 231 of the multiphase separator 230, and opposite end 324 of the plate 320 can be seen extending past the longitudinal axis L of the vessel 231. End 332 of the third angled plate 330 is connected (e.g., welded) to the side 236a of the vessel 231 of the multiphase separator 230, and opposite end 334 of the plate 310 can be seen extending past the longitudinal axis L of the vessel 231.

Each plate 310/320/330 can have a first portion 401 and a second portion 402 connected to the first portion 401. First portion 401 and second portion 402 are generally in the same plane. In aspects, the first portion 401 and the second portion 402 are integrally formed; alternatively, the first portion 401 can be formed separately from the second portion 402, and the side 403 of the first portion 401 can be connected to the side 404 of the second portion 402.

The first portion 401 is generally semi-elliptical in shape in the view shown in FIG. 3. The major radius R1 of the semi-ellipse of the first portion 401 can be in a range of from about 20 inches to about 30 inches; alternatively, from about 24 inches to about 28 inches; alternatively, from about 26 inches to about 27 inches. The minor radius R2 of the semi-ellipse of the first portion 401 can be in a range of from about 18 inches to about 28 inches; alternatively, from about 21 inches to about 26 inches; alternatively, from about 23 inches to about 24 inches. Edge 405 of the first portion 401 can abut and be connected to the inner wall 239 of the vessel 231.

The second portion 402 has edges or sides 406 that can abut or be connected to the inner wall 239 of the vessel 231. End or side 407 of the second portion 402, that is opposite the side 404 of the second portion 402 is the point where fluids fall downward in the vessel 231 (e.g., to another angled plate below the end or side 407 or to the bottom 238 of the vessel 231). End or side 407 of the second portion 402 can have a length or distance D2 in a range of from about 18 inches to about 28 inches; alternatively, from about 21 inches to about 24 inches; alternatively, about 22 inches. The second portion 402 can have a width or distance D3 in a range of from about 7 inches to about 10 inches; alternatively, from about 8 inches to about 9 inches.

Regarding vertically positioning of the angled plates 310/320/330, the end 314/324/334 is generally position lower in the vessel 231 than end 312/322/332. Fluids travel or move on the top surface 313/323/333 in the direction of arrow B.

Figure 5:
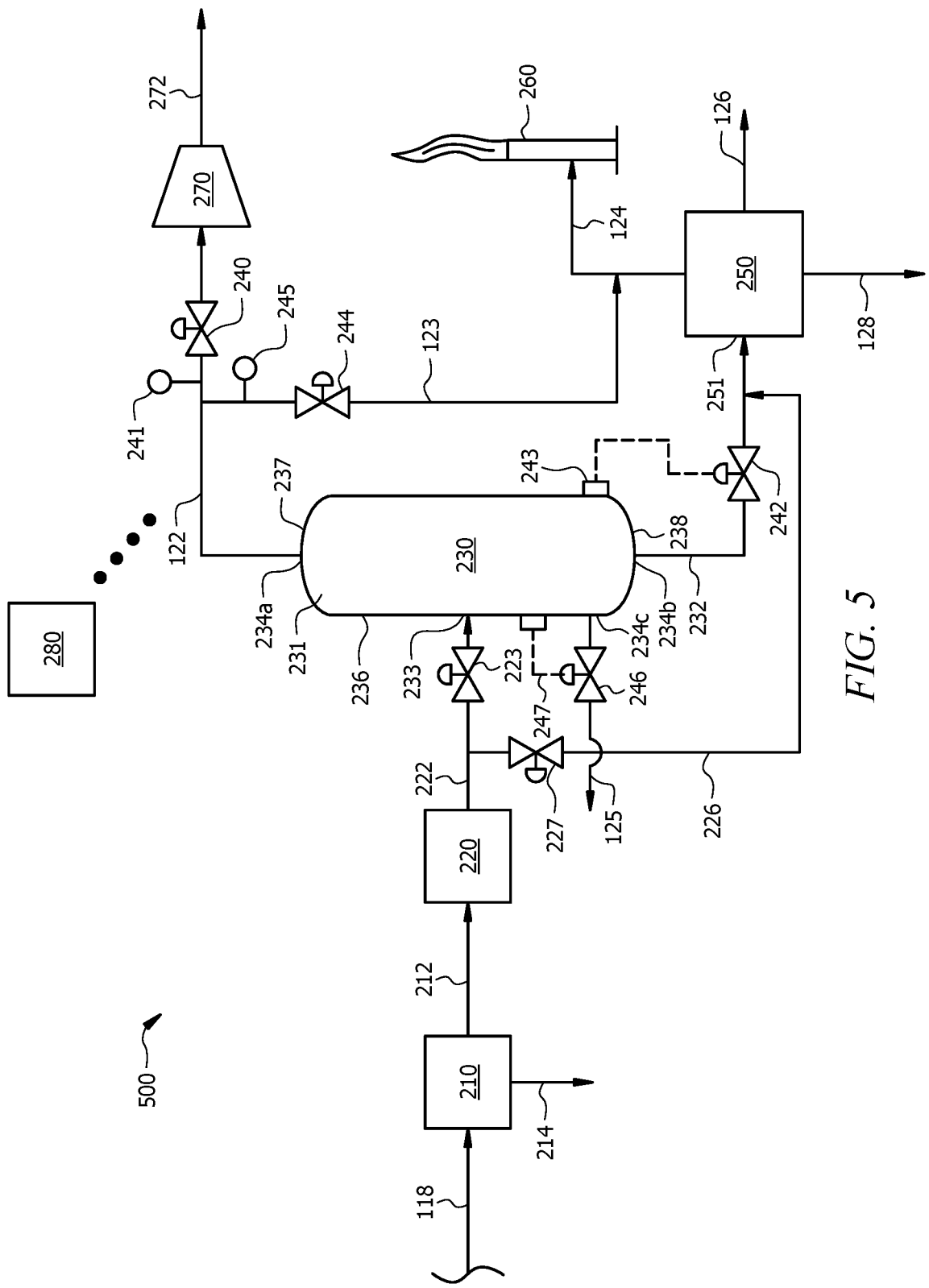
FIG. 5 illustrates a cut-away schematic diagram of another embodiment of the multiphase separator of the disclosed apparatus.

FIG. 5 illustrates a schematic diagram of another embodiment of the disclosed apparatus 500. The apparatus 500 in FIG. 5 can be used as apparatus 120 in FIG. 1, for example. While the apparatus 500 is described with reference to the equipment illustrated in FIG. 5, it should be appreciated that the action and functionality performed with the equipment illustrated in FIG. 5 can be performed in one or more embodiments of a disclosed process.

The apparatus 500 includes the same equipment (e.g., one or more of a plug catcher 210, a choke manifold 220, a multiphase separator 230, one or more back pressure device 240/244, a slurry control valve 242, a sand removal system 250, a flare 260, compressor(s) 270, and a control system 280) as the apparatus 200 in FIG. 2. The apparatus 500 in FIG. 5 differs from the apparatus 200 in FIG. 2 in that the liquid hydrocarbon stream 125 is fluidly connected to the side 236 of the multiphase separator 230 instead of to the sand removal system 250. The multiphase separator 230 in apparatus 500 is configured to recover liquid hydrocarbons (e.g., condensates, crude oil, or both) in the liquid hydrocarbon stream 125 instead of in the slurry stream 232 as described for apparatus 200 in FIG. 2. Fluids received from second stream 222 into the vessel 231 of the multiphase separator 230 separate into the first portion containing light hydrocarbons in the gas phase and a second portion containing liquid hydrocarbons, water, and sand. The second portion further separate in the vessel 231 into a layer of the liquid hydrocarbons on top of the water, and a layer of water on top of the sand. The liquid hydrocarbons includes condensates, crude oil, or both. The liquid hydrocarbons can float on top of the water because the density of the liquid hydrocarbons is less than a density of water. Any alternative embodiments described for apparatus 200 in FIG. 2 apply to the apparatus 500, unless such embodiments would be inconsistent with the operation of apparatus 500.

The apparatus 500 is configured to receive the well stream 118 and to produce a product gas stream 122, a residual gas stream 124, a liquid hydrocarbon stream 125, a liquid aqueous stream 126, and a solids stream 128.

The plug catcher 210, choke manifold 220, multiphase separator 230, sand removal system 250, flare 260, and optional compressor(s) 270 can be connected as described for the apparatus 200 in FIG. 2 and can have same operation except as described below, and as such, the descriptions for apparatus 200 that apply for apparatus 500 are not reproduced here.

The multiphase separator 230 is fluidly connected to the second stream 222. The multiphase separator 230 is configured to receive the second stream 222 and to separate the second stream 222 into the product gas stream 122, the liquid hydrocarbon stream 125, and the slurry stream 232.

The multiphase separator 230 can be embodied as one or more vessels (one vessel 231 being illustrated in FIG. 5) having an inlet 233, a first outlet 234a, a second outlet 234b, and a third outlet 234c. The second stream 222 is connected to the inlet 233, the product gas stream 122 is connected to the first outlet 234a, the slurry stream 232 is connected to the second outlet 234b, and the liquid hydrocarbon stream 125 is connected to the third outlet 234c of the multiphase separator 230. In aspects, the inlet 233 is located on a side 236 of the vessel 201, the first outlet 234a is located on a top 237 of the vessel 231, the second outlet 234b is located on a bottom 238 of the vessel 231, and the third outlet 234c is located on the side 236 of the vessel 231.

The product gas stream 122 can include light hydrocarbon gases as described for apparatus 200 in FIG. 2.

The liquid hydrocarbon stream 125 can include liquid hydrocarbons such as condensates, crude oil, or both. The liquid hydrocarbon stream 125 can be fluidly connected to storage tank(s), and the liquid hydrocarbons can be recovered for storage or pumped to a sales pipeline.

The slurry stream 232 can include a slurry of water, treatment additives, sand, or combinations thereof that is separated from the liquid hydrocarbons in the vessel 231. Because any condensates and/or crude oil are recovered in liquid hydrocarbon stream 125, the slurry stream 232 in apparatus 500 does not contain any significant amount of liquid hydrocarbons (e.g., less than 1, 0.9, 0.8, 0.7, 0.6, 0.5, 0.4, 0.3, 0.2, or 0.1 wt % liquid hydrocarbons based on a total volume of the slurry stream 232). Within the scope of "slurry" as used herein, it is contemplated that the solids can be dispersed in the liquid of the slurry, uniformly or non-uniformly; alternatively, such as while in the vessel 231 of the multiphase separator 230, the slurry can have most of the solids separate from most of the liquid, such as would occur for sand settling to the bottom 238 of the vessel 231 due to a higher density of the sand than the liquids in the vessel 231, the liquids being on top of the sand (it is contemplated that liquid can be entrained between particles of sand that are in the bulk of sand at the bottom 238 of the vessel 231). The scope of slurry contemplates the presence of liquids and solids together regardless whether any certain amount of the solids is dispersed or separate from the liquids.

The product gas stream 122 can include a back pressure device 240 as described for the apparatus 200.

The liquid hydrocarbon stream 125 can include a control valve 246. Control valve 246 can be configured to allow or disallow a flow of liquid hydrocarbons out of the side 236 of the vessel 231 of the multiphase separator 230. The control valve 246 can be embodied as a control valve configured to control a flow of liquid hydrocarbons in the liquid hydrocarbon stream 125. A level sensor 247 can be coupled to the side 236 of the vessel 231 of the multiphase separator 230. The sensor 247 can be float sensor configured to extend into an interior of the vessel 231 and to float on or near a surface of the liquid hydrocarbons in the vessel 231. The sensor 247 can send (or not send) a signal to the control valve 246 to allow or disallow flow of liquid hydrocarbons out of the vessel 231 in the liquid hydrocarbon stream 125, based on the level of liquid hydrocarbons floating on top of the slurry in the vessel 231 relative to a setpoint level for the liquid hydrocarbons. For example, the sensor 247 can send a signal to the control valve 246 to actuate to an open position when the float level is above the setpoint level and send another signal to control valve 246 to actuate to a closed position when the float level falls below the setpoint level. The control valve 246 can be operably coupled to the sensor 247 for actuating the control valve 246 so as to allow or disallow a flow of liquid hydrocarbons through the liquid hydrocarbon stream 125. In some aspects, the control valve 246 and sensor 247 can be operably (e.g., via wired or wireless signal) coupled to the control system 280 that has software programming for receiving the signal from the sensor 247, analyzing the signal, and sending a signal to the control valve 246 to allow or disallow flow of liquid hydrocarbons through the liquid hydrocarbon stream 125.

The slurry stream 232 can include a control valve 242 as described for apparatus 200 in FIG. 2.

In some aspects, flowing slurry out of the vessel 231 via control valve 242 and flowing liquid hydrocarbons out of the vessel 231 via control valve 246 can temporarily reduce the pressure in the vessel 231 while the control valve 242 and/or control valve 246 is/are in the open position, such as when the vol % of liquids and solids recovered from the second stream 222 is greater than the vol % of product gas recovered from the second stream 222. The change in pressure in the vessel 231 can be measured in the vessel 231, in the product gas stream 122, in the product gas bypass line 123, or combinations thereof. In aspects, one or both of sensors 241 and 245 can indicate a change in pressure, and if the pressure falls below a setpoint operating pressure for the multiphase separator 230, the back pressure device(s) 240 and/or 244 that are/is in open position (e.g., depending whether product gas flows to compressor(s) 270 or to flare 260, or to both) can be actuated to a closed position until the pressure in the vessel 231 rises above the setpoint operating pressure, at which time the controls can actuate the back pressure device(s) 240 and/or 244 that are/is in closed position back to the open position.

The connections, operation, and flow of components in the product gas stream 122 and product gas bypass line 123 is the same as described for apparatus 200 in FIG. 2, and such description is not reproduced here. Operation of the back pressure devices 240 and 244 can be the same as described for apparatus 200, and such description is not reproduced here.

The slurry that is removed from the multiphase separator 230 in slurry stream 232 can flow to the sand removal system 250. The inlet 251 of the sand removal system 250 can be fluidly connected to the slurry stream 232. The sand removal system 250 can be configured to receive the slurry from the slurry stream 232 and to separate the slurry into the residual gas stream 124 containing residual gaseous components that were not removed from the slurry in the multiphase separator 230, a liquid aqueous stream 126, and a solids stream 128. In aspects, the residual gas stream 124 contains less than 5, 4, 3, 2, or 1 vol % of the total gases recovered from the second stream 222. The liquid aqueous stream 126 can contain water, treatment additives (e.g., chemicals injected into the subterranean formation 104 to alter a chemistry within the formation to enhance hydrocarbon recovery), or combinations thereof. Because any condensates and/or crude oil are recovered in liquid hydrocarbon stream 125, the liquid aqueous stream 126 in apparatus 500 does not contain any significant amount of liquid hydrocarbons (e.g., less than 1, 0.9, 0.8, 0.7, 0.6, 0.5, 0.4, 0.3, 0.2, or 0.1 wt % liquid hydrocarbons based on a total volume of the liquid aqueous stream 126). The solids stream 128 can contain sand, and in some aspects, small fragments of rock and plugs that pass through the screen(s) in the plug catcher 210.

The sand removal system 250 can be embodied as described for the apparatus 200 in FIG. 2, and such description is not reproduced here, except that since the multiphase separator 230 in apparatus 500 recovers the liquid hydrocarbons from the second stream 222, there is no need for equipment in the sand removal system 250 or downstream of the sand removal system 250 to recover liquid hydrocarbons from the slurry that is received by the sand removal system 250, since the slurry contains no significant amount of liquid hydrocarbons.

Figure 6:
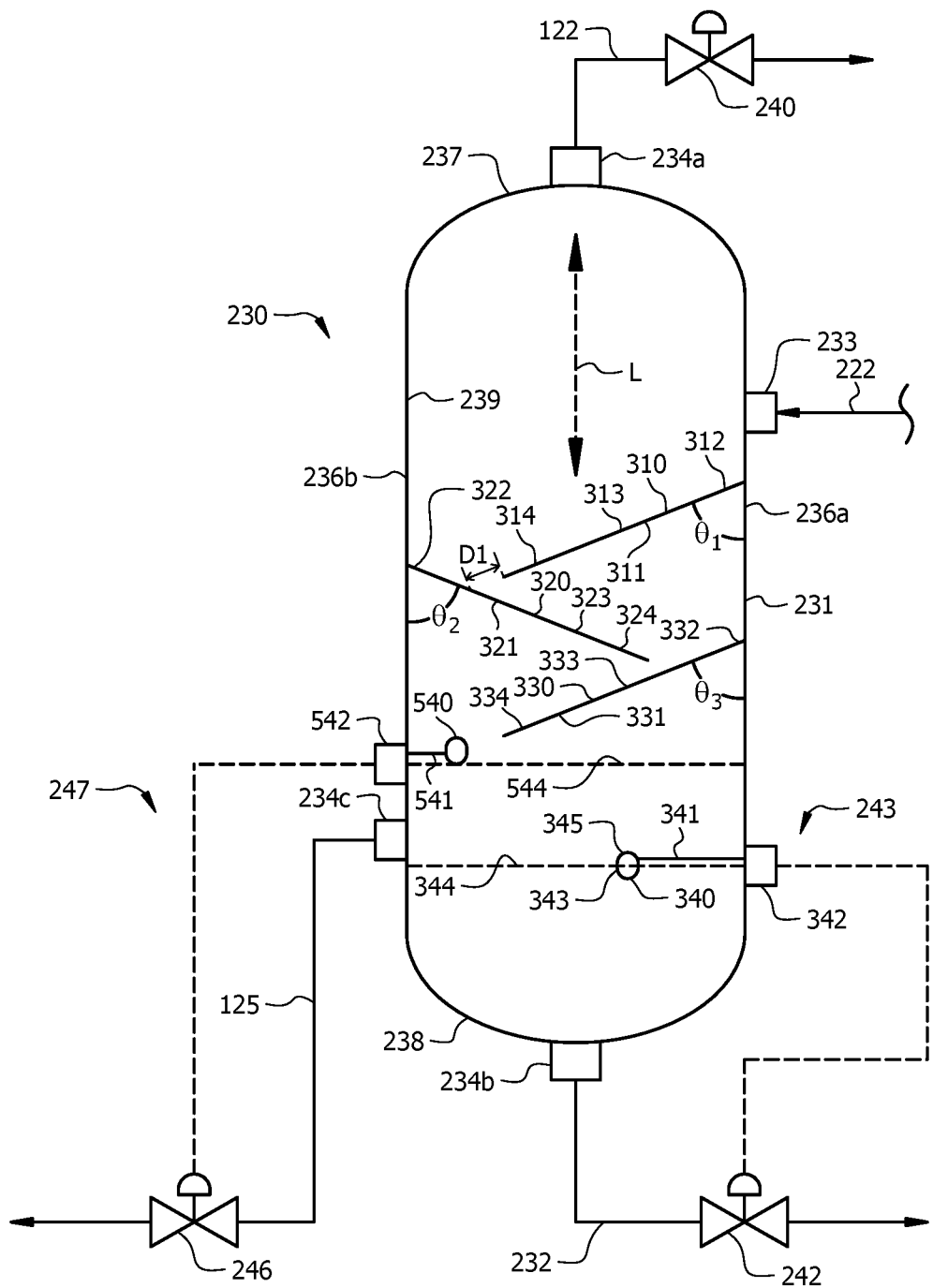
FIG. 6 illustrates a cut-away schematic diagram of the embodiment of the multiphase separator in the apparatus of FIG. 5.

FIG. 6 illustrates a cut-away schematic diagram of the embodiment of the multiphase separator 230 in the apparatus 500 of FIG. 5. Parts of the multiphase separator 230 in FIG. 6 are labeled with the same references numerals for like parts illustrated in FIG. 2, FIG. 3, FIG. 4, and FIG. 5. Angled plates 310, 320, and 330 can be seen in the interior of the vessel 231 of the multiphase separator 230.

The multiphase separator 230 in FIG. 3 is described with respect to separation of the second stream 222 into a first portion of light hydrocarbons in gas phase and a second portion containing liquid hydrocarbons, water, and sand. The second portion can also include treatment additive(s) described herein. The liquid hydrocarbons can include condensates, crude oil, or combinations thereof.

As previously described for the multiphase separator 230 in FIG. 5, the multiphase separator 230 in FIG. 6 can include a vessel 231, an inlet 233 connected to a side 236a of the vessel 231, a first outlet 234a connected to a top 237 of the vessel 231, a second outlet 234b connected to a bottom 238 of the vessel 231, and a third outlet 234c connected to the side 236b (or side 236a) of the vessel 231. The inlet 233 is configured to receive the second stream 222, the first outlet 234a is configured to receive the first portion from the interior of the vessel 231 (gases separated from liquids and solids in the vessel 231), the second outlet 234b is configured to receive the water, treatment additives, sand, or combinations thereof of the second portion from the interior of the vessel 231, and the third outlet 234c is configured to receive the liquid hydrocarbons of the second portion from the interior of the vessel 231.

In the multiphase separator 230 of FIG. 6 (and of FIG. 5), a slurry containing water, treatment additive(s), sand, or combinations thereof is removed from the bottom 238 of the vessel 231 of the multiphase separator 230, and the liquid hydrocarbons are removed from the side 236b (or side 236a) of the vessel 231 of the multiphase separator 230. In aspects, the liquid hydrocarbons are removed separately from the slurry, e.g., the liquid hydrocarbons are removed via liquid hydrocarbon stream 125 and the slurry is removed via slurry stream 232. In aspects, the slurry is removed intermittently based on a level of the slurry in the multiphase separator 230, and the liquid hydrocarbons are removed intermittently based on a level of the liquid hydrocarbons in the multiphase separator 230.

The multiphase separator 230 in FIG. 6 has the same configuration of angled plates 310, 320, and 330 as described for the multiphase separator 230 in FIG. 3; as such, the description is not reproduced here.

The multiphase separator 230 in FIG. 6 can include two level sensors, a first level sensor 243 and a second level sensor 247.

The first level sensor 243 can be seen in FIG. 6 with float 340 connected to a stem 341 that is connected to the body mount 342. The body mount 342 is connected to the side 236a of the vessel 231. While shown connected to side 236a, the body mount 342 can be connected to any location on the circumference of the vessel 231. Generally, the first level sensor 243 is connected to the vessel 231 at a location lower than the lowest angled plate (e.g., the third angled plate 330 in FIG. 3). The float 340 and stem 341 are sized so as not to contact the bottom surface of the lowest plate (e.g., bottom surface 331 of the third plate 330). The movement of the float 340 of the first level sensor 243 in FIG. 6 is in direction of arrow A in FIG. 3. The first level sensor 243 is configured such that the float 340 floats on a top surface of the slurry but does not float within or on top of the liquid hydrocarbons in the vessel 231. For example, for a slurry that contains both solids (e.g., sand) and liquid (e.g., water, treatment additive(s), or both), the sand can fall to the bottom 238 of the vessel 231 and the liquid can position on top of the sand. The float 340 in FIG. 6 is configured with a density less such that a portion 343 of the float 340 is below the top surface 344 of the liquid in the slurry that is in the vessel 231. For example, the density of the float 340 can be set with weights (e.g., metal weights, or sand in the interior of the float 340) such that a bottom portion 343 is below the top surface 344 of the liquid in the slurry and a top portion 345 is above the top surface 344 of the liquid in the slurry. The top portion 345 of the float 340 can extend into the liquid hydrocarbons floating on top of the liquid of the slurry while the bottom portion 343 extends into the liquid of the slurry. Configuring the float 340 with a density such that bottom portion 343 is below the top surface 344 of the liquid of the slurry ensures that the float 340 measures the level of the slurry and the operation of level measurement is not affected by the presence of liquid hydrocarbons in the vessel 231. The float 340 moves up and down as the level of solids and liquids of the slurry raises and lowers due to incoming fluid from the second stream 222 and due to removal of the slurry from the vessel 231 via the slurry stream 232.

The second level sensor 247 can be seen in FIG. 6 with float 540 connected to a stem 541 that is connected to the body mount 542. The body mount 542 is connected to the side 236b of the vessel 231. While shown connected to side 236b, the body mount 542 can be connected to any location on the circumference of the vessel 231. Generally, the second level sensor 247 is connected to the vessel 231 at a location lower than the lowest angled plate (e.g., the third angled plate 330 in FIG. 6) and higher than the first level sensor 243.

The float 540 is configured with a density less than liquid hydrocarbons that may be present in the vessel 231 (e.g., condensates, crude oil, or both of the well stream 118 that is/are in liquid phase in the multiphase separator 230) such that the float 540 can float on a top surface 544 of the liquid hydrocarbons inside the vessel 231. The float 540 moves up and down as the level of liquid hydrocarbons raises and lowers due to incoming fluid from the second stream 222 and due to removal of the slurry from the vessel 231 via the slurry stream 232 and due to removal of the of liquid hydrocarbons from the vessel 231 via liquid hydrocarbon stream 125.

The third outlet 234c is located on the vessel 231 at a location that is lower than the level sensor 247 and at or slightly above the setpoint level for the slurry in the vessel 231 (e.g., at or slightly above the top surface 344 of the liquid in the slurry in the vessel 231).

The multiphase separator 230 can be manufactured of suitable metal, flanges, piping, valving, and combinations thereof. Exemplary internal diameter of the vessel 231 of the multiphase separator 230 includes diameters in the range of from about 36 inches to about 60 inches; alternatively, from about 42 inches to about 54 inches; alternatively, about 48 inches. Exemplary heights of the vessel 231 of the multiphase separator 230 includes heights in the range of from about 108 inches to about 132 inches; alternatively, from about 114 inches to about 126 inches; alternatively, about 120 inches. An exemplary location for the level sensor 243 can be a height on the side 236 of the vessel 231 that is about 3 feet above the bottom 238 of the vessel 231. An exemplary location for the inlet 233 can be a height on the side 236 of the vessel 231 that is about 8 feet above the bottom 238 of the vessel 231, and the angled plates 310/320/330 are placed at locations in the vessel 231 that have a height above the bottom 238 of the vessel 231 that is less than the height of the inlet 233.

Inlet 233 and outlets 234a and 234c can each have a nominal pipe size in a range of from about 4 inches to about 8 inches; alternatively, about 6 inches. Outlet 234b can have a nominal pipe size that is greater than the inlet 233 and outlets 234a and 234c, for example, in a range of from about 8 inches to about 12 inches; alternatively, about 10 inches. The diameter of outlet 234a is configured to prevent undue friction pressure losses of product gas stream 122 and also to reduce internal flow velocities of the product gas stream 122 where there could be a potential of entraining a small percentage of the liquid phase in the fluid flow into outlet 234a. The larger diameter (nominal pipe size) of the outlet 234b is configured to prevent solids blockage in the outlet 234b.

In aspects, the operating conditions in the multiphase separator 230 can be the same as those described for the multiphase separator 230 in FIG. 3, and such description is not reproduced here. Moreover, fluid from stream 222 can flow into the vessel 231 via the inlet 233 and components separate such that the first portion moves into the product gas stream 122 and the second portion passes along the angled plates 310/320/330 as previously described. Level sensors 243 and 247 then control the removal of liquid hydrocarbons and slurry from the vessel 231 as described above.

In some aspects, the techniques described herein relate to a process including: receiving a well stream 118 from a wellbore 102, removing a first plurality of solids having a particle size greater than a particle size of sand from the well stream 118 to form a first stream 212, controlling a flow of the first stream 212 to form a second stream 222 that includes hydrocarbons, water, and sand, separating the second stream 222 in a multiphase separator 230 into a first portion that includes light hydrocarbons in the gas phase and a second portion that includes liquid hydrocarbons, water, and sand, flowing the first portion from the multiphase separator 230 in a product gas stream 122, wherein the product gas stream has a back pressure device 240 located therein, and maintaining, by the back pressure device 240, a pressure in the multiphase separator 230 in a range of from 15.7 psia to about 500 psia. In some aspects of the process, a second pressure of the second stream 222 is in a range of from about 15.7 psia to about 500 psia. In some aspects of the process, the pressure in the multiphase separator 230 is in a range of from about 15.7 psia to about 150 psia; alternatively, about 50 psia.

In some aspects, the step of maintaining can include sensing a pressure of the product gas stream 122 or the pressure in the multiphase separator 230, and adjusting a flow of the first portion through the back pressure device 240.

In some aspects, the process can further include flowing the first portion in the product gas stream 122 to one or more compressors 270, and compressing the first portion in the one or more compressors 270 to form a compressed gas stream 272.

In some aspects, the process can further include flowing the compressed gas stream 272 to a sales pipeline, a vent, a flare, a gas processing unit, a storage tank, or a combination thereof.

In some aspects, the process can include flowing, without compression, the first portion in the product gas stream 122 to a sales pipeline, a vent, a flare, a gas processing unit, a storage tank, or a combination thereof.

In some aspects, the process can include removing the second portion from the multiphase separator 230 (e.g., via the slurry stream 232).

In some aspects, the process can include flowing the second portion in the slurry stream 232 from the multiphase separator 230 to a sand removal system 250, and separating, in the sand removal system 250, the second portion into a residual gas stream 124, a liquid aqueous stream 126, and a solids stream 128.

In some aspects, the process can include combining the residual gas stream 124 with at least a portion of a product gas stream 122 to form a combined gas stream; and flowing the combined gas stream to a flare 260.

In some aspects, the process can include flowing the second portion in the slurry stream from the multiphase separator 230 to a tank in the sand removal system 250.

In some aspects of the process, removing the second portion is performed intermittently based on a level of the second portion and sand in the multiphase separator 230.

In some aspects, the process can further include actuating a valve 242 from a closed position to an open position when the level of the second portion in the multiphase separator 230 exceeds a setpoint level.

In some aspects, the process can include selectively flowing the first stream 212 directly to the multiphase separator 230 or to the sand removal system 250, without passing the first stream 212 to the choke manifold 220.

In some aspects of the process, the first plurality of solids are removed in a plug catcher 210.

In some aspects, the process can include removing a slurry comprising the water and sand from the multiphase separator 230; and removing, separately from the slurry, the liquid hydrocarbons from the multiphase separator 230.

In some aspects of the process, removing the slurry is performed intermittently based on a level of the slurry in the multiphase separator 230, wherein removing the liquid hydrocarbons is performed intermittently based on a level of the liquid hydrocarbons in the multiphase separator 230.

In some aspects, the process can additionally include flowing the slurry in a slurry stream 232 from the multiphase separator 230 to a sand removal system 250; and flowing the liquid hydrocarbons in a liquid hydrocarbon stream 125 from the multiphase separator 230.

In some aspects, the process can additionally include separating, in the sand removal system 250, the slurry into a residual gas stream 124, a liquid aqueous stream 126, and a solids stream 128.

In aspects, the process is performed with any embodiments described herein for the multiphase separator 230. Additionally or alternatively, the process is performed with any embodiments described herein for the plug catcher 210, the choke manifold 220, the back pressure device 240, the control valve 242, the back pressure device 244, the sand removal system 250, the flare 260, the compressor(s) 270, or combinations thereof.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, processes and steps described in the specification. As one of ordinary skill in the art will readily appreciate from the disclosure, processes, machines, manufacture, compositions of matter, means, processes, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, processes, or steps.

What is claimed is:

1. A process comprising:
   receiving a well stream from a wellbore;
   removing a first plurality of solids having a particle size greater than a particle size of sand from the well stream to form a first stream;
   controlling a flow of the first stream to form a second stream comprising hydrocarbons, water, and sand;
   separating the second stream in a multiphase separator into a first portion comprising light hydrocarbons in a gas phase and a second portion comprising liquid hydrocarbons, water, and sand;
   flowing the first portion from the multiphase separator in a product gas stream, wherein the product gas stream has a back pressure device located therein;
   removing a slurry comprising the water and sand from the multiphase separator;
   removing, separately from the slurry, the liquid hydrocarbons from the multiphase separator; and
   maintaining, by the back pressure device, a pressure in the multiphase separator in a range of from 15.7 psia to about 500 psia,
   wherein the multiphase separator comprises:
   a vessel;
   an inlet connected to a side of the vessel and configured to receive the second stream;
   a first outlet connected to the vessel and configured to receive the first portion;
   a second outlet connected to a bottom of the vessel and configured to receive the slurry;
   a third outlet connected to the side of the vessel and configured to receive the liquid hydrocarbons;
   a first level sensor comprising a first float, wherein the first float has a first density greater than a density of water such that a bottom portion of the first float is below a top surface of the slurry in the multiphase separator; and
   a second level senor comprising a second float, wherein the second float has a second density that is less than a density of the liquid hydrocarbons in the multiphase separator.

2. The process of claim 1, wherein the pressure in the multiphase separator is about 50 psia.

3. The process of claim 1, wherein the maintaining comprises:
   sensing a pressure of the product gas stream or the pressure in the multiphase separator; and
   adjusting a flow of the first portion through the back pressure device.

4. The process of claim 1, further comprising:
   flowing the first portion in the product gas stream to one or more compressors;
   compressing the first portion in the one or more compressors to form a compressed gas stream; and flowing the compressed gas stream to a sales pipeline, a vent, a flare, a gas processing unit, a storage tank, or a combination thereof.

5. The process of claim 1, further comprising:
flowing, without compression, the first portion in the product gas stream to a sales pipeline, a vent, a flare, a gas processing unit, a storage tank, or a combination thereof.

6. The process of claim 1, wherein removing the slurry is preformed intermittently.

7. The process of claim 1, wherein removing the liquid hydrocarbons is performed intermittently.

8. The process of claim 1, further comprising:
flowing the slurry in a slurry stream from the multiphase separator to a sand removal system.

9. The process of claim 8, further comprising:
separating, in the sand removal system, the slurry into a residual gas stream, a liquid aqueous stream, and a solids stream.

10. The process of claim 1, wherein the multiphase separator further comprises:
a plurality of angled plates, wherein each of the plurality of angled plates has an end connected to an inner wall of the vessel.

11. The process of claim 10, wherein a top plate of the plurality of angled plates is connected to the inner wall at a location that is below where the inlet is connected to the vessel.

12. The process of claim 10, wherein an angle between a bottom surface of each of the plurality of angled plates and the inner wall is in a range of from about 45° to about 75°.

13. The process of claim 10, wherein an opposite end of each of the plurality of angled plates extends past a longitudinal axis of the vessel.

14. The process of claim 9, further comprising:
combining the residual gas stream with at least a portion of the product gas stream to form a combined gas stream; and
flowing the combined gas stream to a flare.

15. The process of claim 1, further comprising:
flowing the liquid hydrocarbons in a liquid hydrocarbon stream from the multiphase separator.

16. The process of claim 1, wherein the slurry is removed based on a level of the slurry in the multiphase separator.

17. The process of claim 1, wherein the liquid hydrocarbons are removed based on a level of the liquid hydrocarbons in the multiphase separator.

* * * * *